(12) United States Patent
Belling et al.

(10) Patent No.: US 11,991,660 B2
(45) Date of Patent: May 21, 2024

(54) APPARATUS, METHODS, AND COMPUTER PROGRAMS

(71) Applicant: Nokia Technologies Oy, Espoo (FI)

(72) Inventors: Thomas Belling, Erding (DE); Bruno Landais, Pleumeur-Bodou (FR); Saurabh Khare, Bangalore (IN); Anja Jerichow, Grafing bei München (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 359 days.

(21) Appl. No.: 17/487,482

(22) Filed: Sep. 28, 2021

(65) Prior Publication Data

US 2022/0110082 A1 Apr. 7, 2022

(30) Foreign Application Priority Data

Oct. 1, 2020 (IN) .............................. 202041042858

(51) Int. Cl.
| | |
|---|---|
| *H04W 12/08* | (2021.01) |
| *H04L 9/40* | (2022.01) |
| *H04W 8/00* | (2009.01) |
| *H04W 60/04* | (2009.01) |
| *H04W 84/04* | (2009.01) |

(52) U.S. Cl.
CPC ............. *H04W 60/04* (2013.01); *H04L 63/20* (2013.01); *H04W 8/005* (2013.01); *H04W 12/08* (2013.01); *H04W 84/042* (2013.01)

(58) Field of Classification Search
CPC ............................... H04W 60/04; H04W 63/20
See application file for complete search history.

(56) References Cited

U.S. PATENT DOCUMENTS

| | | | |
|---|---|---|---|
| 9,860,234 | B2 | 1/2018 | Sondhi et al. |
| 10,666,661 | B2 | 5/2020 | Zhang |
| 11,510,052 | B2 * | 11/2022 | Zhang ........................ H04L 9/30 |
| 2004/0054723 | A1 * | 3/2004 | Dayal ................... H04L 67/561 |
| | | | 709/204 |
| 2005/0232283 | A1 | 10/2005 | Moyer et al. |

(Continued)

FOREIGN PATENT DOCUMENTS

| | | |
|---|---|---|
| EP | 1783962 A1 | 5/2007 |
| WO | 2019/223855 A1 | 11/2019 |

(Continued)

OTHER PUBLICATIONS

Office action received for corresponding Indian Patent Application No. 202041042858, dated Jul. 5, 2022, 7 pages.

(Continued)

*Primary Examiner* — Michael T Vu
(74) *Attorney, Agent, or Firm* — Robert P. Michal, Esq.; Carter, DeLuca & Farrell LLP

(57) ABSTRACT

There is provided an apparatus configured to receive, from a first network entity associated with a first domain in a communication network, a request to communicate; determine a second network entity to which to send the request; determine that the second network entity is associated with a second domain in the communication network; and enforce at least one access policy for routing the request to the network entity, wherein the apparatus is a first service communication proxy trusted in both the first and second domains.

1 Claim, 8 Drawing Sheets

(56) References Cited

U.S. PATENT DOCUMENTS

| | | | |
|---|---|---|---|
| 2008/0159304 A1 | 7/2008 | Ozugur et al. | |
| 2016/0127352 A1 | 5/2016 | Xu et al. | |
| 2018/0278603 A1 | 9/2018 | Yabe | |
| 2021/0377272 A1* | 12/2021 | Dasari | H04L 63/20 |

FOREIGN PATENT DOCUMENTS

| | | |
|---|---|---|
| WO | 2019/240793 A1 | 12/2019 |
| WO | 2020/002764 A1 | 1/2020 |
| WO | 2020/141356 A1 | 7/2020 |

OTHER PUBLICATIONS

"3rd Generation Partnership Project; Technical Specification Group Services and System Aspects; Security architecture and procedures for 5G system (Release 16)", 3GPP TS 33.501, V16.3.0, Jul. 2020, pp. 1-248.

"Enablers for multiple SCPs (23.501)", 3GPP TSG-SA2 Meeting #138-E, S2-2003269, Oracle Corporation, Apr. 20-23, 2020, 12 pages.

"Enablers for multiple SCPs (23.502)", 3GPP TSG-SA2 Meeting #138-E, S2-2003270, Oracle Corporation, Apr. 20-23, 2020, 7 pages.

"SCP profile registration and discovery", 3GPP TSG-CT WG4 Meeting #98e, C4-203497, Nokia, Jun. 2-12, 2020, 47 pages.

"3rd Generation Partnership Project; Technical Specification Group Core Network and Terminals; 5G System; Network Function Repository Services; Stage 3 (Release 16)", 3GPP TS 29.510, V16.4.0, Jul. 2020, pp. 1-192.

"3rd Generation Partnership Project; Technical Specification Group Core Network and Terminals; 5G System; Technical Realization of Service Based Architecture; Stage 3 (Release 16)", 3GPP TS 29.500, V16.3.0, Mar. 2020, pp. 1-65.

"3rd Generation Partnership Project; Technical Specification Group Services and System Aspects; Procedures for the 5G System (5GS); Stage 2 (Release 16)", 3GPP TS 23.502, V16.4.0, Mar. 2020, pp. 1-582.

"3rd Generation Partnership Project; Technical Specification Group Services and System Aspects; System Architecture for the 5G System (5GS); Stage 2 (Release 16)", 3GPP TS 23.501 V16.2.0, Sep. 2019, pp. 1-391.

"3rd Generation Partnership Project; Technical Specification Group Services and System Aspects; Security architecture and procedures for 5G system (Release 16)", 3GPP TS 33.501, V16.0.0, Sep. 2019, pp. 1-196.

"3rd Generation Partnership Project; Technical Specification Group Services and System Aspects; Security Aspects; Study on security aspects of the 5G Service Based Architecture (SBA) (Release 16)", 3GPP TR 33.855, V1.8.0, Oct. 2019, pp. 1-102.

"3rd Generation Partnership Project; Technical Specification Group Core Network and Terminals; 5G System; Common Data Types for Service Based Interfaces; Stage 3 (Release 16)", 3GPP TS 29.571, V16.4.0, Jun. 2020, pp. 1-121.

Jones et al., "JSON Web Signature (JWS)", RFC 7515, Internet Engineering Task Force, May 2015, pp. 1-59.

Hardt, "The OAuth 2.0 Authorization Framework", RFC 6749, Internet Engineering Task Force, Oct. 2012, pp. 1-76.

"3rd Generation Partnership Project; Technical Specification Group Core Network and Terminals; 5G System; Principles and Guidelines for Services Definition; Stage 3 (Release 16)", 3GPP TS 29.501, V16.4.0, Jun. 2020, pp. 1-73.

International Search Report and Written Opinion received for corresponding Patent Cooperation Treaty Application No. PCT/IB2021/056348, dated Oct. 8, 2021, 12 pages.

Extended European Search Report received for corresponding European Patent Application No. 21198798.7, dated Jun. 3, 2022, 12 pages.

Partial European Search Report received for corresponding European Patent Application No. 21198798.7, dated Feb. 10, 2022, 14 pages.

* cited by examiner

APPARATUS, METHODS, AND COMPUTER PROGRAMS

FIELD

The present disclosure relates to apparatus, methods, and computer programs, and in particular but not exclusively to apparatus, methods and computer programs for network apparatuses.

BACKGROUND

A communication system can be seen as a facility that enables communication sessions between two or more entities such as user terminals, access nodes and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Content may be unicast or multicast to communication devices.

A user can access the communication system by means of an appropriate communication device or terminal. A communication device of a user is often referred to as user equipment (UE) or user device. The communication device may access a carrier provided by an access node, and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is UTRAN (3G radio). Another example of an architecture that is known is the long-term evolution (LTE) or the Universal Mobile Telecommunications System (UMTS) radio-access technology. Another example communication system is so called 5G radio or new radio (NR) access technology.

SUMMARY

According to a first aspect, there is provided an apparatus comprising: at least one processor; and at least one memory including computer program code; the at least one memory and the computer program code being configured to, with the at least one processor, cause the apparatus at least to: receive, from a first network entity associated with a first domain in a communication network, a request to communicate; determine a second network entity to which to send the request; determine that the second network entity is associated with a second domain in the communication network; and enforce at least one access policy for routing the request to the network entity, wherein the apparatus is a first service communication proxy trusted in both the first and second domains.

The apparatus may further be caused to send a registration request to a registration entity in the communication network, wherein the registration request identifies at least one domain with which the apparatus is trusted.

The determine the second network entity, and the determine that the second network entity is associated with the second domain, may be performed by the apparatus being caused to: send a discovery request to a registration entity in the communication network; receive a response to the discovery request, the response comprising one or several candidate second network entities and for each candidate second network entity an indication of the second domain; and use the response to determine the second network entity out of the one or several candidate second network entities and that the second network entity is associated with the second domain.

The determination of the second network entity, and the determination that the second network entity is associated with the second domain, may be performed by the apparatus being caused to: use addressing information comprised within the received request to determine the second network entity; and determine the second domain based on the addressing information.

The addressing information may comprise a target uniform resource identifier comprised within a Hypertext Transfer Protocol header.

The at least one access policy may relate to at least one of: determining whether at least one parameter is on a whitelist for facilitating access to a network entity associated with the second domain in the communication network; determining whether at least one parameter is on a blacklist for facilitating access to a network entity associated with the second domain in the communication network; rejecting messages having a size greater than a threshold value; checking and/or modifying the contents of a message to be communicated to a network entity associated with the second domain in the communication network; checking the presence of access token or client credential within a message to be communicated to a network entity associated with the second domain in the communication network; requesting an access token or client credential on behalf of a network entity associated with the first domain in the communication network; rejecting a request if an access token or client credential is not comprised within a message to be communicated to a network entity associated with a second domain in the communication network, an access token or client credential is required to be included by a network entity associated with a second domain in the communication network and the apparatus cannot obtain an access token or client credential on behalf of a network entity associated with the first domain in the communication network; rejecting a request if there have been more than a predetermined number and/or predetermined frequency of requests from network entities associated with a first domain in the communication network towards network entities associated with a second domain in the communication network; and validating a path for the message to be passed from a network entity associated with the first domain in the communication network to a network entity associated with the second domain in the communication network.

The first network entity may be one of a first network function and a second service communication proxy.

The second network entity may be one of a second network function and a third service communication proxy.

The at least one domain with which the apparatus is trusted may be smaller than a public land mobile network in which the apparatus operates.

The at least one domain may comprise one or more service communication proxy domains.

The registration request may comprise at least one of: a service communication proxy identifier; a Fully Qualified Domain Name of the first service communication proxy; an Internet Protocol address of the first service communication proxy; an indication that the profile is of a service communication proxy; capacity information for the first service communication proxy; current load information for the first service communication proxy; priority information for the first service communication proxy; location information for the first service communication proxy; served location(s); Network Slice related Identifier(s); an identification of remote Public Land Mobile Networks reachable through the first service communication proxy; endpoint addresses accessible via the first service communication proxy; identifiers of service communication proxies interconnected with the first service communication proxy; identifiers of network functions interconnected with the first; network function sets of network functions served by the first service communication proxy; and service communication proxy Domains to which the first service communication proxy belongs.

According to a second aspect, there is provided an apparatus comprising: at least one processor; and at least one memory including computer program code; the at least one memory and the computer program code being configured to, with the at least one processor, cause the apparatus at least to: receive, from a first network entity, a registration request to register with the apparatus, the request identifying at least one domain in which the first network entity is located; determine whether the first network entity is trusted and whether the first network entity is entitled to register the identified domain; and if the determination is positive, register the first network entity for discovery.

The apparatus may be caused to: receive a request for discovering at least one network entity; and respond to the request with information relating to the first network entity.

The first network entity may be one of a service communication proxy and a network function.

The at least one domain with which the apparatus is trusted may be smaller than a public land mobile network in which the apparatus operates.

The at least one domain may comprise one or more service communication proxy domains.

The registration request may comprise at least one of: a service communication proxy identifier; a Fully Qualified Domain Name of the first service communication proxy; an Internet Protocol address of the first service communication proxy; an indication that the profile is of a service communication proxy; capacity information for the first service communication proxy; current load information for the first service communication proxy; priority information for the first service communication proxy; location information for the first service communication proxy; served location(s); Network Slice related Identifier(s); an identification of remote Public Land Mobile Networks reachable through the first service communication proxy; endpoint addresses accessible via the first service communication proxy; identifiers of service communication proxies interconnected with the first service communication proxy; identifiers of network functions interconnected with the first; network function sets of network functions served by the first service communication proxy; and service communication proxy Domains to which the first service communication proxy belongs.

According to a third aspect, there is provided an apparatus comprising: at least one processor; and at least one memory including computer program code; the at least one memory and the computer program code being configured to, with the at least one processor, cause the apparatus at least to: send, to a registration entity, a registration request to register with the apparatus, the request identifying at least one domain in which the apparatus is trusted, wherein the apparatus comprises a first service communication proxy.

The at least one domain with which the apparatus is trusted may be smaller than a public land mobile network in which the apparatus operates.

The at least one domain may comprise one or more service communication proxy domains.

The registration request may comprise at least one of: a service communication proxy identifier; a Fully Qualified Domain Name of the first service communication proxy; an Internet Protocol address of the first service communication proxy; an indication that the profile is of a service communication proxy; capacity information for the first service communication proxy; current load information for the first service communication proxy; priority information for the first service communication proxy; location information for the first service communication proxy; served location(s); Network Slice related Identifier(s); an identification of remote Public Land Mobile Networks reachable through the first service communication proxy; endpoint addresses accessible via the first service communication proxy; identifiers of service communication proxies interconnected with the first service communication proxy; identifiers of network functions interconnected with the first; network function sets of network functions served by the first service communication proxy; and service communication proxy Domains to which the first service communication proxy belongs.

According to a fourth aspect, there is provided an apparatus comprising: means for receiving, from a first network entity associated with a first domain in a communication network, a request to communicate; means for determining a second network entity to which to send the request; means for determining that the second network entity is associated with a second domain in the communication network; and means for enforcing at least one access policy for routing the request to the network entity, wherein the apparatus is a first service communication proxy trusted in both the first and second domains.

The apparatus may further comprise means for sending a registration request to a registration entity in the communication network, wherein the registration request identifies at least one domain with which the apparatus is trusted.

The means for determining the second network entity, and the means for determining that the second network entity is associated with the second domain, may comprise: means for sending a discovery request to a registration entity in the communication network; means for receiving a response to the discovery request, the response comprising one or several candidate second network entities and for each candidate second network entity an indication of the second domain; and means for using the response to determine the second network entity out of the one or several candidate second network entities and that the second network entity is associated with the second domain.

The determine the second network entity, and the determine that the second network entity is associated with the second domain, may comprise: means for using addressing information comprised within the received request to determine the second network entity; and means for determining the second domain based on the addressing information.

The addressing information may comprise a target uniform resource identifier comprised within a Hypertext Transfer Protocol header.

The at least one access policy may relate to at least one of: determining whether at least one parameter is on a whitelist for facilitating access to a network entity associated with the second domain in the communication network; determining whether at least one parameter is on a blacklist for facilitating access to a network entity associated with the second domain in the communication network; rejecting messages having a size greater than a threshold value; checking and/or modifying the contents of a message to be communicated to a network entity associated with the second domain in the communication network; checking the presence of access token or client credential within a message to be communicated to a network entity associated with the second domain in the communication network; requesting an access token or client credential on behalf of a network entity associated with the first domain in the communication network; rejecting a request if an access token or client credential is not comprised within a message to be communicated to a network entity associated with a second domain in the communication network, an access token or client credential is required to be included by a network entity associated with a second domain in the communication network and the apparatus cannot obtain an access token or client credential on behalf of a network entity associated with the first domain in the communication network; rejecting a request if there have been more than a predetermined number and/or predetermined frequency of requests from network entities associated with a first domain in the communication network towards network entities associated with a second domain in the communication network; and validating a path for the message to be passed from a network entity associated with the first domain in the communication network to a network entity associated with the second domain in the communication network.

The first network entity may be one of a first network function and a second service communication proxy.

The second network entity may be one of a second network function and a third service communication proxy.

The at least one domain with which the apparatus is trusted may be smaller than a public land mobile network in which the apparatus operates.

The at least one domain may comprise one or more service communication proxy domains.

The registration request may comprise at least one of: a service communication proxy identifier; a Fully Qualified Domain Name of the first service communication proxy; an Internet Protocol address of the first service communication proxy; an indication that the profile is of a service communication proxy; capacity information for the first service communication proxy; current load information for the first service communication proxy; priority information for the first service communication proxy; location information for the first service communication proxy; served location(s); Network Slice related Identifier(s); an identification of remote Public Land Mobile Networks reachable through the first service communication proxy; endpoint addresses accessible via the first service communication proxy; identifiers of service communication proxies interconnected with the first service communication proxy; identifiers of network functions interconnected with the first; network function sets of network functions served by the first service communication proxy; and service communication proxy Domains to which the first service communication proxy belongs.

According to a fifth aspect, there is provided an apparatus comprising: means for receiving, from a first network entity, a registration request to register with the apparatus, the request identifying at least one domain in which the first network entity is located; means for determining whether the first network entity is trusted and whether the first network entity is entitled to register the identified domain; and means for, if the determination is positive, register the first network entity for discovery.

The apparatus may comprise: means for receiving a request for discovering at least one network entity; and means for responding to the request with information relating to the first service communication proxy.

The first network entity may be one of a service communication proxy and a network function.

The at least one domain with which the apparatus is trusted may be smaller than a public land mobile network in which the apparatus operates.

The at least one domain may comprise one or more service communication proxy domains.

The registration request may comprise at least one of: a service communication proxy identifier; a Fully Qualified Domain Name of the first service communication proxy; an Internet Protocol address of the first service communication proxy; an indication that the profile is of a service communication proxy; capacity information for the first service communication proxy; current load information for the first service communication proxy; priority information for the first service communication proxy; location information for the first service communication proxy; served location(s); Network Slice related Identifier(s); an identification of remote Public Land Mobile Networks reachable through the first service communication proxy; endpoint addresses accessible via the first service communication proxy; identifiers of service communication proxies interconnected with the first service communication proxy; identifiers of network functions interconnected with the first; network function sets of network functions served by the first service communication proxy; and service communication proxy Domains to which the first service communication proxy belongs.

According to a sixth aspect, there is provided an apparatus comprising: means for sending, to a registration entity, a registration request to register with the apparatus, the request identifying at least one domain in which the apparatus is trusted, wherein the apparatus comprises a first service communication proxy.

The at least one domain with which the apparatus is trusted may be smaller than a public land mobile network in which the apparatus operates.

The at least one domain may comprise one or more service communication proxy domains.

The registration request may comprise at least one of: a service communication proxy identifier; a Fully Qualified Domain Name of the first service communication proxy; an Internet Protocol address of the first service communication proxy; an indication that the profile is of a service communication proxy; capacity information for the first service communication proxy; current load information for the first service communication proxy; priority information for the first service communication proxy; location information for the first service communication proxy; served location(s); Network Slice related Identifier(s); an identification of remote Public Land Mobile Networks reachable through the first service communication proxy; endpoint addresses accessible via the first service communication proxy; identifiers of service communication proxies interconnected with the first service communication proxy; identifiers of network functions interconnected with the first; network function sets of network functions served by the first service communication proxy; and service communication proxy Domains to which the first service communication proxy belongs.

According to a seventh aspect, there is provided a method comprising: receiving, from a first network entity associated with a first domain in a communication network, a request to communicate; determining a second network entity to which to send the request; determining that the second network entity is associated with a second domain in the communication network; and enforcing at least one access policy for routing the request to the network entity, wherein the apparatus is a first service communication proxy trusted in both the first and second domains.

The method may further comprise sending a registration request to a registration entity in the communication network, wherein the registration request identifies at least one domain with which the apparatus is trusted.

The determining the second network entity, and the determining that the second network entity is associated with the second domain, may be performed by sending a discovery request to a registration entity in the communication network; receiving a response to the discovery request, the response comprising one or several candidate second network entities and for each candidate second network entity an indication of the second domain; and using the response to determine the second network entity out of the one or several candidate second network entities and that the second network entity is associated with the second domain.

The determining the second network entity, and the determining that the second network entity is associated with the second domain, may comprise: using addressing information comprised within the received request to determine the second network entity; and determining the second domain based on the addressing information.

The addressing information may comprise a target uniform resource identifier comprised within a Hypertext Transfer Protocol header.

The at least one access policy may relate to at least one of: determining whether at least one parameter is on a whitelist for facilitating access to a network entity associated with the second domain in the communication network; determining whether at least one parameter is on a blacklist for facilitating access to a network entity associated with the second domain in the communication network; rejecting messages having a size greater than a threshold value; checking and/or modifying the contents of a message to be communicated to a network entity associated with the second domain in the communication network; checking the presence of access token or client credential within a message to be communicated to a network entity associated with the second domain in the communication network; requesting an access token or client credential on behalf of a network entity associated with the first domain in the communication network; rejecting a request if an access token or client credential is not comprised within a message to be communicated to a network entity associated with a second domain in the communication network, an access token or client credential is required to be included by a network entity associated with a second domain in the communication network and the apparatus cannot obtain an access token or client credential on behalf of a network entity associated with the first domain in the communication network; rejecting a request if there have been more than a predetermined number and/or predetermined frequency of requests from network entities associated with a first domain in the communication network towards network entities associated with a second domain in the communication network; and validating a path for the message to be passed from a network entity associated with the first domain in the communication network to a network entity associated with the second domain in the communication network.

The first network entity may be one of a first network function and a second service communication proxy.

The second network entity may be one of a second network function and a third service communication proxy.

The at least one domain with which the apparatus is trusted may be smaller than a public land mobile network in which the apparatus operates.

The at least one domain may comprise one or more service communication proxy domains.

The registration request may comprise at least one of: a service communication proxy identifier; a Fully Qualified Domain Name of the first service communication proxy; an Internet Protocol address of the first service communication proxy; an indication that the profile is of a service communication proxy; capacity information for the first service communication proxy; current load information for the first service communication proxy; priority information for the first service communication proxy; location information for the first service communication proxy; served location(s); Network Slice related Identifier(s); an identification of remote Public Land Mobile Networks reachable through the first service communication proxy; endpoint addresses accessible via the first service communication proxy; identifiers of service communication proxies interconnected with the first service communication proxy; identifiers of network functions interconnected with the first; network function sets of network functions served by the first service communication proxy; and service communication proxy Domains to which the first service communication proxy belongs.

According to an eighth aspect, there is provided a method comprising: receiving, from a first network entity, a registration request to register with the apparatus, the request identifying at least one domain in which the first network entity is located; determining whether the first network entity is trusted and whether the first network entity is entitled to register the identified domain; and if the determination is positive, registering the first network entity for discovery.

The method may comprise: receiving a request for discovering at least one network entity; and responding to the request with information relating to the first network entity.

The first network entity may be one of a service communication proxy and a network function.

The at least one domain with which the apparatus is trusted may be smaller than a public land mobile network in which the apparatus operates.

The at least one domain may comprise one or more service communication proxy domains.

The registration request may comprise at least one of: a service communication proxy identifier; a Fully Qualified Domain Name of the first service communication proxy; an Internet Protocol address of the first service communication proxy; an indication that the profile is of a service communication proxy; capacity information for the first service communication proxy; current load information for the first service communication proxy; priority information for the first service communication proxy; location information for the first service communication proxy; served location(s); Network Slice related Identifier(s); an identification of remote Public Land Mobile Networks reachable through the first service communication proxy; endpoint addresses accessible via the first service communication proxy; identifiers of service communication proxies interconnected with the first service communication proxy; identifiers of network functions interconnected with the first; network function sets of network functions served by the first service communication proxy; and service communication proxy Domains to which the first service communication proxy belongs.

According to a ninth aspect, there is provided a method comprising: sending, to a registration entity, a registration request to register with the apparatus, the request identifying at least one domain in which the apparatus is trusted, wherein the apparatus comprises a first service communication proxy.

The at least one domain with which the apparatus is trusted may be smaller than a public land mobile network in which the apparatus operates.

The at least one domain may comprise one or more service communication proxy domains.

The registration request may comprise at least one of: a service communication proxy identifier; a Fully Qualified Domain Name of the first service communication proxy; an Internet Protocol address of the first service communication proxy; an indication that the profile is of a service communication proxy; capacity information for the first service communication proxy; current load information for the first service communication proxy; priority information for the first service communication proxy; location information for the first service communication proxy; served location(s); Network Slice related Identifier(s); an identification of remote Public Land Mobile Networks reachable through the first service communication proxy; endpoint addresses accessible via the first service communication proxy; identifiers of service communication proxies interconnected with the first service communication proxy; identifiers of network functions interconnected with the first; network function sets of network functions served by the first service communication proxy; and service communication proxy Domains to which the first service communication proxy belongs.

According to a tenth aspect, there is provided an apparatus comprising: receiving circuitry for receiving, from a first network entity associated with a first domain in a communication network, a request to communicate; determining circuitry for determining a second network entity to which to send the request; determining circuitry for determining that the second network entity is associated with a second domain in the communication network; and enforcing circuitry for enforcing at least one access policy for routing the request to the network entity, wherein the apparatus is a first service communication proxy trusted in both the first and second domains.

The apparatus may further comprise sending circuitry for sending a registration request to a registration entity in the communication network, wherein the registration request identifies at least one domain with which the apparatus is trusted.

The determining circuitry for determining the second network entity, and the determining circuitry for determining that the second network entity is associated with the second domain, may comprise: sending circuitry for sending a discovery request to a registration entity in the communication network; receiving circuitry for receiving a response to the discovery request, the response comprising one or several candidate second network entities and for each candidate second network entity an indication of the second domain; and using circuitry for using the response to determine the second network entity out of the one or several candidate second network entities and that the second network entity is associated with the second domain.

The determining circuitry for determining the second network entity, and the determining circuitry for determining that the second network entity is associated with the second domain, may comprise: using circuitry for using addressing information comprised within the second network entity; and determining circuitry for determining the second domain based on the addressing information.

The addressing information may comprise a target uniform resource identifier comprised within a Hypertext Transfer Protocol header.

The at least one access policy may relate to at least one of: determining whether at least one parameter is on a whitelist for facilitating access to a network entity associated with the second domain in the communication network; determining whether at least one parameter is on a blacklist for facilitating access to a network entity associated with the second domain in the communication network; rejecting messages having a size greater than a threshold value; checking and/or modifying the contents of a message to be communicated to a network entity associated with the second domain in the communication network; checking the presence of access token or client credential within a message to be communicated to a network entity associated with the second domain in the communication network; requesting an access token or client credential on behalf of a network entity associated with the first domain in the communication network; rejecting a request if an access token or client credential is not comprised within a message to be communicated to a network entity associated with a second domain in the communication network, an access token or client credential is required to be included by a network entity associated with a second domain in the communication network and the apparatus cannot obtain an access token or client credential on behalf of a network entity associated with the first domain in the communication network; rejecting a request if there have been more than a predetermined number and/or predetermined frequency of requests from network entities associated with a first domain in the communication network towards network entities associated with a second domain in the communication network; and validating a path for the message to be passed from a network entity associated with the first domain in the communication network to a network entity associated with the second domain in the communication network.

The first network entity may be one of a first network function and a second service communication proxy.

The second network entity may be one of a second network function and a third service communication proxy.

The at least one domain with which the apparatus is trusted may be smaller than a public land mobile network in which the apparatus operates.

The at least one domain may comprise one or more service communication proxy domains.

The registration request may comprise at least one of: a service communication proxy identifier; a Fully Qualified Domain Name of the first service communication proxy; an Internet Protocol address of the first service communication proxy; an indication that the profile is of a service communication proxy; capacity information for the first service communication proxy; current load information for the first service communication proxy; priority information for the first service communication proxy; location information for the first service communication proxy; served location(s); Network Slice related Identifier(s); an identification of remote Public Land Mobile Networks reachable through the first service communication proxy; endpoint addresses accessible via the first service communication proxy; identifiers of service communication proxies interconnected with the first service communication proxy; identifiers of network functions interconnected with the first; network function sets of network functions served by the first service communication proxy; and service communication proxy Domains to which the first service communication proxy belongs.

According to an eleventh aspect, there is provided an apparatus comprising: receiving circuitry for receiving, from a first network entity, a registration request to register with the apparatus, the request identifying at least one domain in which the first network entity is located; determining circuitry for determining whether the first network entity is trusted and whether the first network entity is entitled to register the identified domain; and registering circuitry for, if the determination is positive, registering the first network entity for discovery.

The apparatus may comprise: receiving circuitry for receiving a request for discovering at least one network entity; and responding circuitry for responding to the request with information relating to the first network entity.

The first network entity may be one of a service communication proxy and a network function.

The at least one domain with which the apparatus is trusted may be smaller than a public land mobile network in which the apparatus operates.

The at least one domain may comprise one or more service communication proxy domains.

The registration request may comprise at least one of: a service communication proxy identifier; a Fully Qualified Domain Name of the first service communication proxy; an Internet Protocol address of the first service communication proxy; an indication that the profile is of a service communication proxy; capacity information for the first service communication proxy; current load information for the first service communication proxy; priority information for the first service communication proxy; location information for the first service communication proxy; served location(s); Network Slice related Identifier(s); an identification of remote Public Land Mobile Networks reachable through the first service communication proxy; endpoint addresses accessible via the first service communication proxy; identifiers of service communication proxies interconnected with the first service communication proxy; identifiers of network functions interconnected with the first; network function sets of network functions served by the first service communication proxy; and service communication proxy Domains to which the first service communication proxy belongs.

According to a twelfth aspect, there is provided an apparatus comprising: sending circuitry for sending, to a registration entity, a registration request to register with the apparatus, the request identifying at least one domain in which the apparatus is trusted, wherein the apparatus comprises a first service communication proxy.

The at least one domain with which the apparatus is trusted may be smaller than a public land mobile network in which the apparatus operates.

The at least one domain may comprise one or more service communication proxy domains.

The registration request may comprise at least one of: a service communication proxy identifier; a Fully Qualified Domain Name of the first service communication proxy; an Internet Protocol address of the first service communication proxy; an indication that the profile is of a service communication proxy; capacity information for the first service communication proxy; current load information for the first service communication proxy; priority information for the first service communication proxy; location information for the first service communication proxy; served location(s); Network Slice related Identifier(s); an identification of remote Public Land Mobile Networks reachable through the first service communication proxy; endpoint addresses accessible via the first service communication proxy; identifiers of service communication proxies interconnected with the first service communication proxy; identifiers of network functions interconnected with the first; network function sets of network functions served by the first service communication proxy; and service communication proxy Domains to which the first service communication proxy belongs.

According to a thirteenth aspect, there is provided non-transitory computer readable medium comprising program instructions for causing a network apparatus to perform at least the following: receive, from a first network entity associated with a first domain in a communication network, a request to communicate; determine a second network entity to which to send the request; determine that the second network entity is associated with a second domain in the communication network; and enforce at least one access policy for routing the request to the network entity, wherein the apparatus is a first service communication proxy trusted in both the first and second domains.

The apparatus may further be caused to send a registration request to a registration entity in the communication network, wherein the registration request identifies at least one domain with which the apparatus is trusted.

The determining the second network entity, and the determining that the second network entity is associated with the second domain, may comprise: sending a discovery request to a registration entity in the communication network; receiving a response to the discovery request, the response comprising one or several candidate second network entities and for each candidate second network entity an indication of the second domain; and using the response to determine the second network entity out of the one or several candidate second network entities and that the second network entity is associated with the second domain.

The determining the second network entity, and the determining that the second network entity is associated with the second domain, may comprise: using addressing information comprised within the received request to determine the second network entity; and determining the second domain based on the addressing information.

The addressing information may comprise a target uniform resource identifier comprised within a Hypertext Transfer Protocol header.

The at least one access policy may relate to at least one of: determining whether at least one parameter is on a whitelist for facilitating access to a network entity associated with the second domain in the communication network; determining whether at least one parameter is on a blacklist for facilitating access to a network entity associated with the second domain in the communication network; rejecting messages having a size greater than a threshold value; checking and/or modifying the contents of a message to be communicated to a network entity associated with the second domain in the communication network; checking the presence of access token or client credential within a message to be communicated to a network entity associated with the second domain in the communication network; requesting an access token or client credential on behalf of a network entity associated with the first domain in the communication network; rejecting a request if an access token or client credential is not comprised within a message to be communicated to a network entity associated with a second domain in the communication network, an access token or client credential is required to be included by a network entity associated with a second domain in the communication network and the apparatus cannot obtain an access token or client credential on behalf of a network entity associated with the first domain in the communication network; rejecting a request if there have been more than a predetermined number and/or predetermined frequency of requests from network entities associated with a first domain in the communication network towards network entities associated with a second domain in the communication network; and validating a path for the message to be passed from a network entity associated with the first domain in the communication network to a network entity associated with the second domain in the communication network.

The first network entity may be one of a first network function and a second service communication proxy.

The second network entity may be one of a second network function and a third service communication proxy.

The at least one domain with which the apparatus is trusted may be smaller than a public land mobile network in which the apparatus operates.

The at least one domain may comprise one or more service communication proxy domains.

The registration request may comprise at least one of: a service communication proxy identifier; a Fully Qualified Domain Name of the first service communication proxy; an Internet Protocol address of the first service communication proxy; an indication that the profile is of a service communication proxy; capacity information for the first service communication proxy; current load information for the first service communication proxy; priority information for the first service communication proxy; location information for the first service communication proxy; served location(s); Network Slice related Identifier(s); an identification of remote Public Land Mobile Networks reachable through the first service communication proxy; endpoint addresses accessible via the first service communication proxy; identifiers of service communication proxies interconnected with the first service communication proxy; identifiers of network functions interconnected with the first; network function sets of network functions served by the first service communication proxy; and service communication proxy Domains to which the first service communication proxy belongs.

According to a fourteenth aspect, there is provided non-transitory computer readable medium comprising program instructions for causing a network apparatus to perform at least the following: receive, from a first network entity, a registration request to register with the apparatus, the request identifying at least one domain in which the first network entity is located; determine whether the first network entity is trusted and whether the first network entity is entitled to register the identified domain; and if the determination is positive, register the first network entity for discovery.

The apparatus may be caused to perform: receive a request for discovering at least one network entity; and respond to the request with information relating to the first network entity.

The first network entity may be one of a service communication proxy and a network function.

The at least one domain with which the apparatus is trusted may be smaller than a public land mobile network in which the apparatus operates.

The at least one domain may comprise one or more service communication proxy domains.

The registration request may comprise at least one of: a service communication proxy identifier; a Fully Qualified Domain Name of the first service communication proxy; an Internet Protocol address of the first service communication proxy; an indication that the profile is of a service communication proxy; capacity information for the first service communication proxy; current load information for the first service communication proxy; priority information for the first service communication proxy; location information for the first service communication proxy; served location(s); Network Slice related Identifier(s); an identification of remote Public Land Mobile Networks reachable through the first service communication proxy; endpoint addresses accessible via the first service communication proxy; identifiers of service communication proxies interconnected with the first service communication proxy; identifiers of network functions interconnected with the first; network function sets of network functions served by the first service communication proxy; and service communication proxy Domains to which the first service communication proxy belongs.

According to a fifteenth aspect, there is provided non-transitory computer readable medium comprising program instructions for causing a network apparatus to perform at least the following: send, to a registration entity, a registration request to register with the apparatus, the request identifying at least one domain in which the apparatus is trusted, wherein the apparatus comprises a first service communication proxy.

The at least one domain with which the apparatus is trusted may be smaller than a public land mobile network in which the apparatus operates.

The at least one domain may comprise one or more service communication proxy domains.

The registration request may comprise at least one of: a service communication proxy identifier; a Fully Qualified Domain Name of the first service communication proxy; an Internet Protocol address of the first service communication proxy; an indication that the profile is of a service communication proxy; capacity information for the first service communication proxy; current load information for the first service communication proxy; priority information for the first service communication proxy; location information for the first service communication proxy; served location(s); Network Slice related Identifier(s); an identification of remote Public Land Mobile Networks reachable through the first service communication proxy; endpoint addresses accessible via the first service communication proxy; identifiers of service communication proxies interconnected with the first service communication proxy; identifiers of network functions interconnected with the first; network function sets of network functions served by the first service communication proxy; and service communication proxy Domains to which the first service communication proxy belongs.

According to a sixteenth aspect, there is provided a computer program comprising program instructions for causing a computer to perform any method as described above.

According to a seventeenth aspect, there is provided a computer program product stored on a medium that may cause an apparatus to perform any method as described herein.

According to an eighteenth aspect, there is provided an electronic device that may comprise apparatus as described herein.

According to a fourteenth aspect, there is provided a chipset that may comprise an apparatus as described herein.

Various other aspects are also described in the following detailed description and in the attached claims.

BRIEF DESCRIPTION OF FIGURES

Embodiments will now be described, by way of example only, with reference to the accompanying Figures in which.

DETAILED DESCRIPTION

In the following certain embodiments are explained with reference to mobile communication devices capable of communication via a wireless cellular system and mobile communication systems serving such mobile communication devices. Before explaining in detail the exemplifying embodiments, certain general principles of a 5G wireless communication system are briefly explained with reference to FIG. 1.

Figure 1:
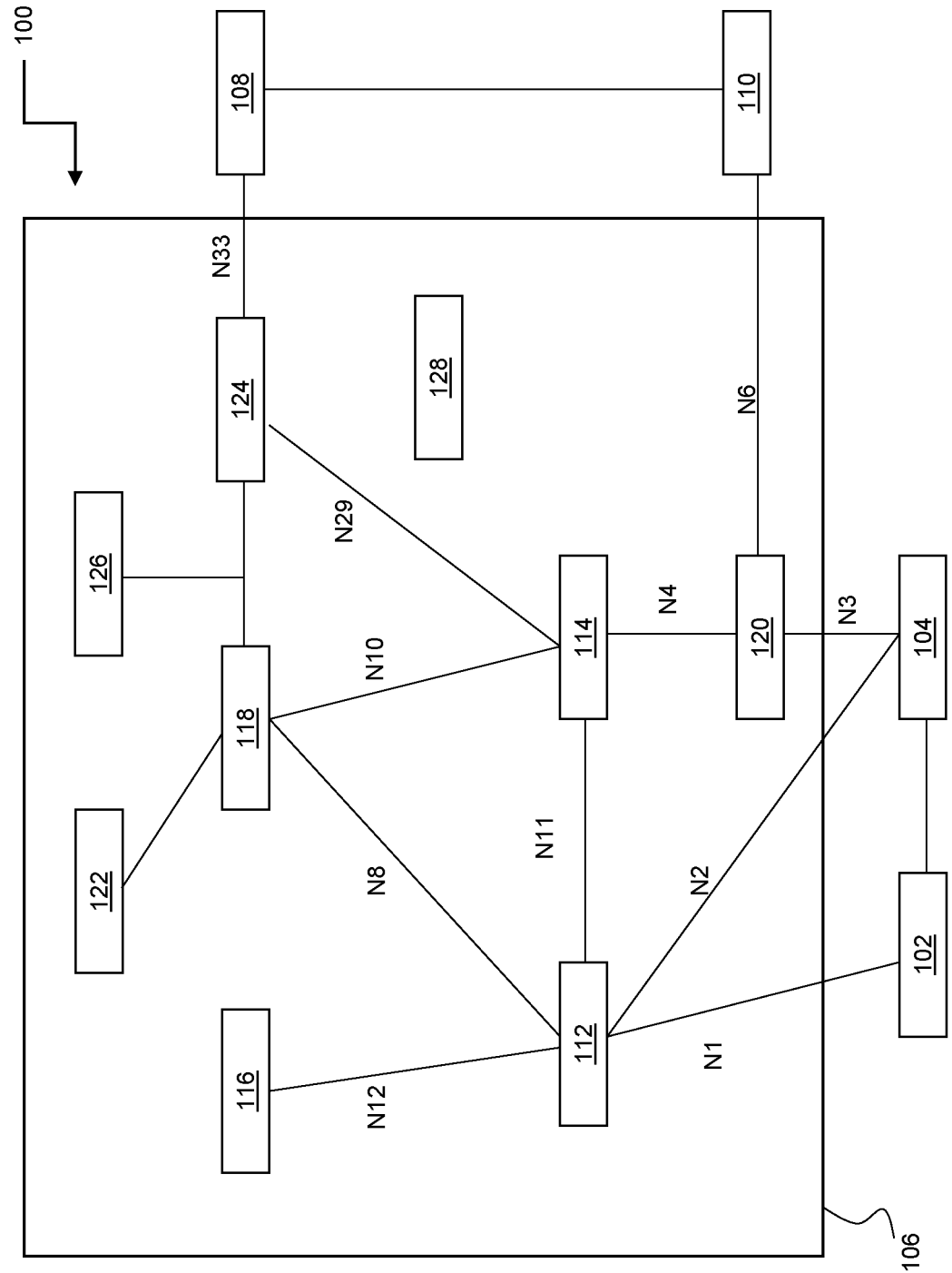
FIG. 1 shows a schematic representation of a 5G system.

FIG. 1 shows a schematic representation of a 5G system (5GS) 100. The 5GS may comprise a user equipment (UE) 102 (which may also be referred to as a communication device or a terminal), a 5G access network (AN) (which may be a 5G Radio Access Network (RAN) or any other type of 5G AN such as a Non-3GPP Interworking Function (N3IWF)/a Trusted Non3GPP Gateway Function (TNGF) for Untrusted/Trusted Non-3GPP access or Wireline Access Gateway Function (W-AGF) for Wireline access) 104, a 5G core (5GC) 106, one or more application functions (AF) 108 and one or more data networks (DN) 110.

The 5G RAN may comprise one or more gNodeB (gNB) distributed unit functions connected to one or more gNodeB (gNB) centralized unit functions. The RAN may comprise one or more access nodes.

The 5GC 106 may comprise one or more access management functions (AMF) 112, one or more session management functions (SMF) 114, one or more authentication server functions (AUSF) 116, one or more unified data management (UDM) functions 118, one or more user plane functions (UPF) 120, one or more unified data repository (UDR) functions 122, one or more network repository functions (NRF) 128, and/or one or more network exposure functions (NEF) 124. Although NRF 128 is not depicted with its interfaces, it is understood that this is for clarity reasons and that NRF 128 may have a plurality of interfaces with other network functions.

The 5GC 106 also comprises a network data analytics function (NWDAF) 126. The NWDAF is responsible for providing network analytics information upon request from one or more network functions or apparatus within the network. Network functions can also subscribe to the NWDAF 126 to receive information therefrom. Accordingly, the NWDAF 126 is also configured to receive and store network information from one or more network functions or apparatus within the network. The data collection by the NWDAF 126 may be performed based on at least one subscription to the events provided by the at least one network function.

The 5GC (5G Core network) has been defined as a Service Based Architecture (SBA). Service-Based Architectures provide a modular framework from which common applications can be deployed using components of varying sources and suppliers. Control plane functionality and common data repositories of a 5G network may thus be delivered by way of a set of interconnected Network Functions (NFs), each with authorization to access each other's services, with Network Function (NF) service producers exposing services to NF service consumers. NFs may act as service consumers and/or as service providers. NF service providers register their NF profile in a Network Repository Function (NRF). An NRF maintains an updated repository of 5G elements available in the operator's network, along with the services provided by each of the elements in the 5G core that are expected to be instantiated, scaled and/or terminated without, or with minimal manual intervention. In other words, the NRF maintains a record of available NF instances and their supported services. The NRF allows other NF instances to subscribe and be notified of registrations from NF instances of a given type. The NRF may support service discovery, by receipt of Discovery Requests from NF instances and details which NF instances support specific services. Therefore, NF Service consumers or Service Communication Proxies (SCPs) (which obtain NF services on behalf of another network entity) may discover NF service producers by performing for example, an NF Discovery procedure towards the NRF.

Release 16 of 5GS provides further information on SCPs (see, for example, 3GPP TS23.501—System architecture for the 5G System). In general, a service proxy works by acting as an intermediary between a client and a server. In this 5G case, an SCP may provide a single point of entry for a cluster of network functions, once they have been successfully discovered by the Network Repository Function. This allows the SCP to become a delegated discovery point in a data center, offloading the Network Repository Function from the numerous distributed services meshes that would otherwise ultimately make up a network operator's infrastructure. In other words, discovery requests may be directed to an SCP, which may facilitate access to a plurality of network functions without referring to a Network Repository Function.

In addition to performing discovery features for NFs, an SCP may implement an individual Service Agent for respective network functions. This allows for indirect communications between 5G core components in the Service-based architecture of 5G. The Service Agent may perform tasks that are peripheral to the primary role that the network function was designed to perform, for example interworking, service segmentation, service-centric access control and load balancing. Supported by a Service Mesh Controller, the Service Agent can implement global access control lists that prevent unauthorized communications between network functions. Consequently, rather than individual Internet Protocol (IP) address blocklists or allowlists, for example, the Service Agent can implement a rule that simply identifies network functions and is applicable regardless of the IP network address ranges those network functions employ. SCPs may also provide a centralized configuration file that can be called-on by all similar functions. This may dramatically reduce the potential for errors and makes system-wide updates and upgrades much easier Therefore, in summary, an SCP may be considered as acting as an intermediary between different network elements in a service-based architecture communication network. Functions provided by SCPs may range from simplifying network topology by applying signaling aggregation and routing, to load balancing, overload handling and message parameter harmonization. Moreover, the SCP may perform delegate discovery and provides communication authorization and security functions, in addition to internetworking for signaling between 2G, 3G, 4G, 5G, IMS, Fixed/Wi-Fi and IT networks.

To find SCPs, an SCP discovery procedure may be performed.

Similar to Network Functions, SCPs may be discovered by signaling a Network Repository Function with which the SCPs are registered for more information. An SCP may be treated by the Network Repository Function in the same way as NFs for Discovery purposes. Specifically, an SCP may be designated with a specific NF type and NF instance ID, despite not supporting services (unlike network functions).

This means that an SCP is first registered with a Network Repository Function in order to be discoverable. An SCP profile (discussed further below) associated with a particular SCP may be registered with the NRF, and used to discover the particular SCP when an NRF Discovery procedure is used. If the consumer is an SCP (i.e. if the entity requesting to be registered), the discovery registration (and hence the SCP profile) may include information such as an indication of remote PLMNs reachable through the registering SCP, endpoint addresses or Address Domain(s) (e.g. IP Address or Fully Qualified Domain Name (FQDN) ranges) accessible via the registering SCP, information on NF sets of NFs served by the registering SCP, and NF types of NFs served by the SCP. An NF set may be considered to be a set of interchangeable NF instances of the same type, and thus support the same services and same network slices.

SCP discovery in scenarios with multiple SCPs in the signaling path has recently been discussed. These discussions introduced the concept of SCP domains. An SCP domain may be considered as being a configured group of one or more SCPs that can reach certain NF instances or SCPs directly, i.e. without passing through an intermediate SCP. The SCP profile for registering a particular SCP with an NRF was subsequently defined to identify domains associated with a particular SCP. One potential function of the SCP profile may thus be to identify all SCP domains to which a registered/registering SCP is interconnected.

SCP profiles may comprise a number of different types of identifying and categorizing information that may be used for discovery purposes. For example, an SCP profile may comprise any of: an SCP ID, an FQDN or IP address of the SCP, an indication that the profile is of an SCP (e.g. NF type parameter set to type SCP), SCP capacity information, current SCP load information, SCP priority information, location information for the SCP, served location(s), Network Slice related Identifier(s), identification of remote PLMNs reachable through the SCP, endpoint addresses accessible via the SCP, interconnected SCP IDs, interconnected NF IDs, NF sets of NFs served by the SCP, and SCP Domains the SCP belongs to. If an SCP belongs to more than one SCP Domain, the SCP may be able bridge these domains, i.e. sending messages between these domains.

The SCP profiles may also be used to identify those SCPs that interconnect domains. Moreover, an SCP can then use this profile information to discover the next hop SCP to which received signaling is to be routed. This can be useful to route a service request from a consumer to a producer via one or more SCPs.

Figure 5:
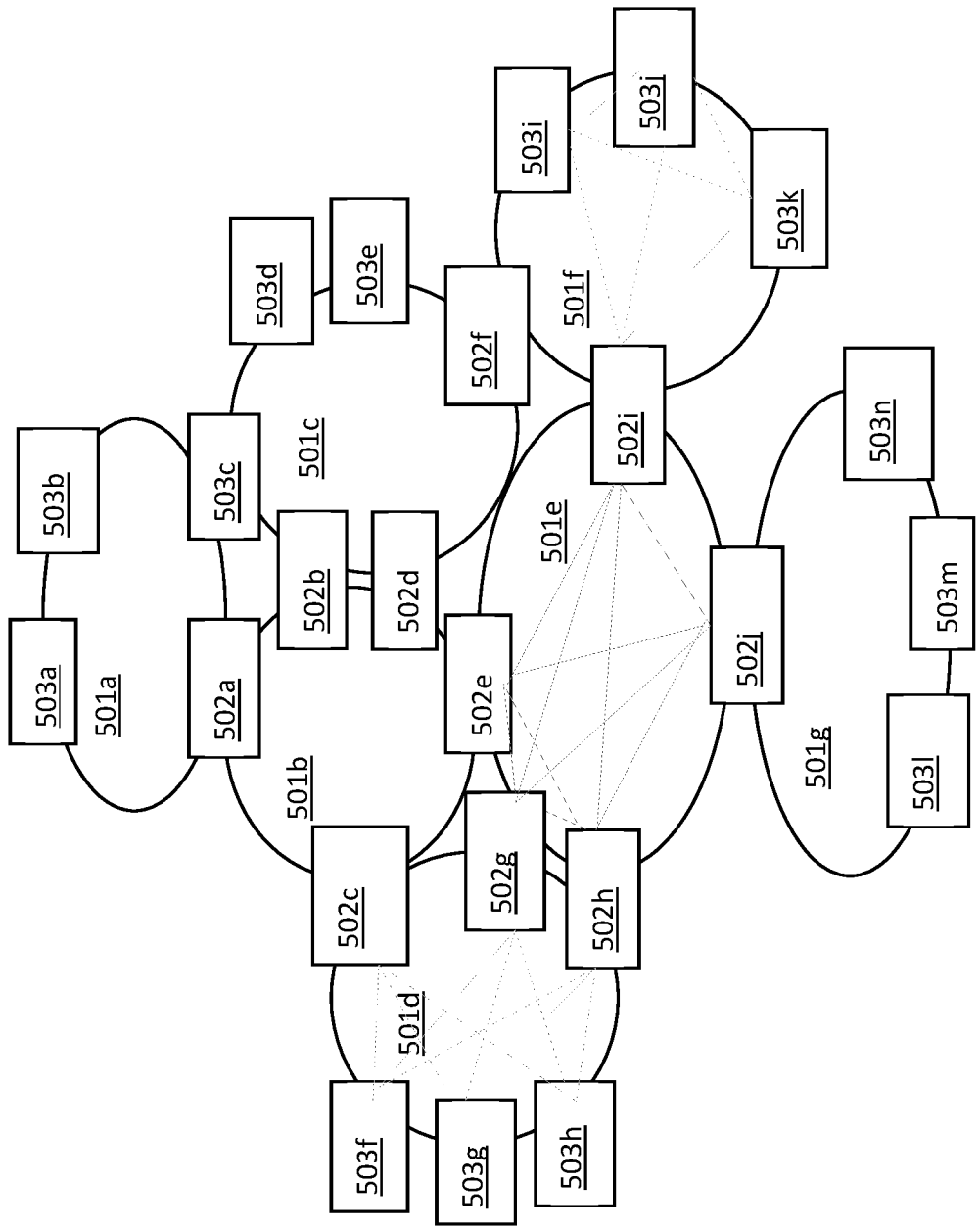
FIGS. 5 and 6 show example network structures.

FIG. 5 illustrates an example network in which SCP domains are shown.

FIG. 5 shows a first SCP domain 501a, a second SCP domain 501b, a third SCP domain 501c, a fourth SCP domain 501d, a fifth SCP domain 501e, a sixth SCP domain 501f and a seventh SCP domain 501g.

The first SCP domain 501a comprises a first SCP 502a, which is directly connected to a first network function 503a, a second network function 502b and a third network function 502c.

The second SCP domain 501b comprises the first SCP 502a, a second SCP 502b, a third SCP 502c, a fourth SCP 502d and a fifth SCP 502e.

The third SCP domain 501b comprises the second SCP 502b, the fourth SCP 502d and a sixth SCP 502f. Together, these three SCPs are directly connected to the third NF 503c, a fourth NF 503d and a fifth NF 503e.

The fourth SCP domain 501d comprises the third SCP 502c, a seventh SCP 502g and an eighth SCP 502h. Together, these three SCPs are directly connected to a sixth NF 503f, a seventh NF 503g and an eighth NF 503h.

The fifth SCP domain 501e comprises the fifth SCP 502c, the seventh SCP 502g, the eighth SCP 502h, a ninth SCP 502i and a tenth SCP 503j.

The sixth SCP domain 501f comprises the sixth SCP 502f and the ninth SCP 502i. Together, these two SCPs are directly connected to a ninth NF 503i, a tenth NF 503j and an eleventh 503k.

The seventh SCP domain 501g comprises the tenth SCP 502j, which is directly connected to a twelfth NF 503l, a thirteenth NF 503m and to a fourteenth NF 503n.

Security for connections between SCPs and from the NFs to SCPs is currently being discussed.

Currently, a network-wide (e.g. a Public Land Mobile Network, PLMN, -wide) trust between NFs and SCPs is assumed. This assumes that SCPs and NFs within a single PLMN are assumed to trust each other, while SCPs and NFs outside of that single PLMN are authenticated in some way before communicating with the SCPs and NFs within the single PLMN.

The following realizes that it may be advantageous to provide different/further restrictions in more complex multi-vendor networks, and/or in large PLMNs that are operated by different organizations in different regions/jurisdictions.

This concept may have especial relevance for technical domains. A technical domain may be defined in any of a plurality of different ways. For example, a technical domain may be defined based on compute center boundaries. As another example, a technical domain may be based on operators of subnetworks. As another example, a technical domain may be based on regions/jurisdictions. Technical domains may also be defined in dependence on a combination of different factors, such as combinations of the presently listed examples.

A single PLMN may thus comprise several technical domains, where equipment with different capabilities is deployed and signaling also varies in some aspects, e.g. if equipment of different vendors is deployed, or an equipment upgrade is performed in a stepwise manner. Neither trust nor the policing of communication within or among such technical domains has previously been considered.

Trust/security has been considered in communication networks in other contexts. For example, in 5G systems, security been considered in relation to Security Edge Protection Proxy (SEPP) communication protocols.

SEPP communication protocols have been arranged to help enable secure interconnect between 5G networks by ensuring end-to-end confidentiality and/or integrity between source and destination network for all 5G interconnect roaming messages. Additionally, the SEPP performs centralized roaming partner management, topology hiding, and throttling of incoming signaling messages. Communications between different SEPPs have a specific security for interconnecting different PLMNs. These secure inter-SEPP communications currently use a security protocol called the Parity Replication in IP-Network Storages (PRINS) protocol, where the SEPPs enforce protection policies regarding application layer security to ensure integrity and confidentiality protection. However, as this is between different SEPPs, which relate to different PLMNs, these mechanisms are not relevant to communications within a single PLMN, such as between SCPs and between NFs and SCPs. In other words, as SEPP communications protocols apply to inter-PLMN communications, they do not apply to intra-PLMN communications.

As mentioned above, SCPs do provide some security features. For example, authentication and authorization between SCPs is described in 3GPP TS 33.501. However, this communication protocol currently only relates to authentication, while authorization between SCPs is described as being for further study (see clause 13.3.7 of 3GPP TS 33.501).

The following introduces the concept of trust to technical domains. In particular, the following describes grouping one or more SCP domains to form technical domains based on trust (i.e. trust domains). This means that all SCPs within a trust domain trust all other SCPs within that trust domain There may be SCPs that are trusted by at least two trust domains. In other words, there may be SCPs that are allowed to communicate both within their trust domain and also with another SCP of another trust domain Such communications may traverse boundaries between trust domains. For clarity throughout the following, SCPs that are allowed to communicate between with SCPs of different trust domains will be called bridging SCPs in the following. These trust domains may cover a smaller region than the PLMN, and so may enforce trust on a more granular scale than PLMN-wide. The NRF may enforce whether SCP domains registered by SCPs or NFs are correct. For example, if an SCP registers, the registering SCP may provide an identifier of the SCP domain to which the registering SCP wants to register. The NRF can then check whether the registered SCP is authorized to be part of this SCP domain. If SCP has provided an incorrect domain (i.e. an SCP domain identifier for which the registering SCP is not authorized), then registration is aborted by the NRF.

SCPs may discover the boundaries of trust domains in any of a plurality of different ways. For example, an SCP may determine its own trust domain based on an SCP domain from which a request is received and/or that it forwards a request to. As another example, an SCP may determine its trust domain based on previously configured knowledge of the relationship of trust or technical domains and SCP domains. Based on this information, the SCP may thus determine whether the request is allowed to traverse a boundary between trust/technical domain. The SCP may also use such information to determine whether any extra policing of the request is required.

In relation to the previously mentioned bridging SCPs between different trust domains, a bridging SCP may perform policing of traffic between trust domains. For example, a bridging SCP may perform extra policing of a received communication if that bridging SCP discovers that the received communication has traversed a boundary between trust/technical domain.

Figure 6:
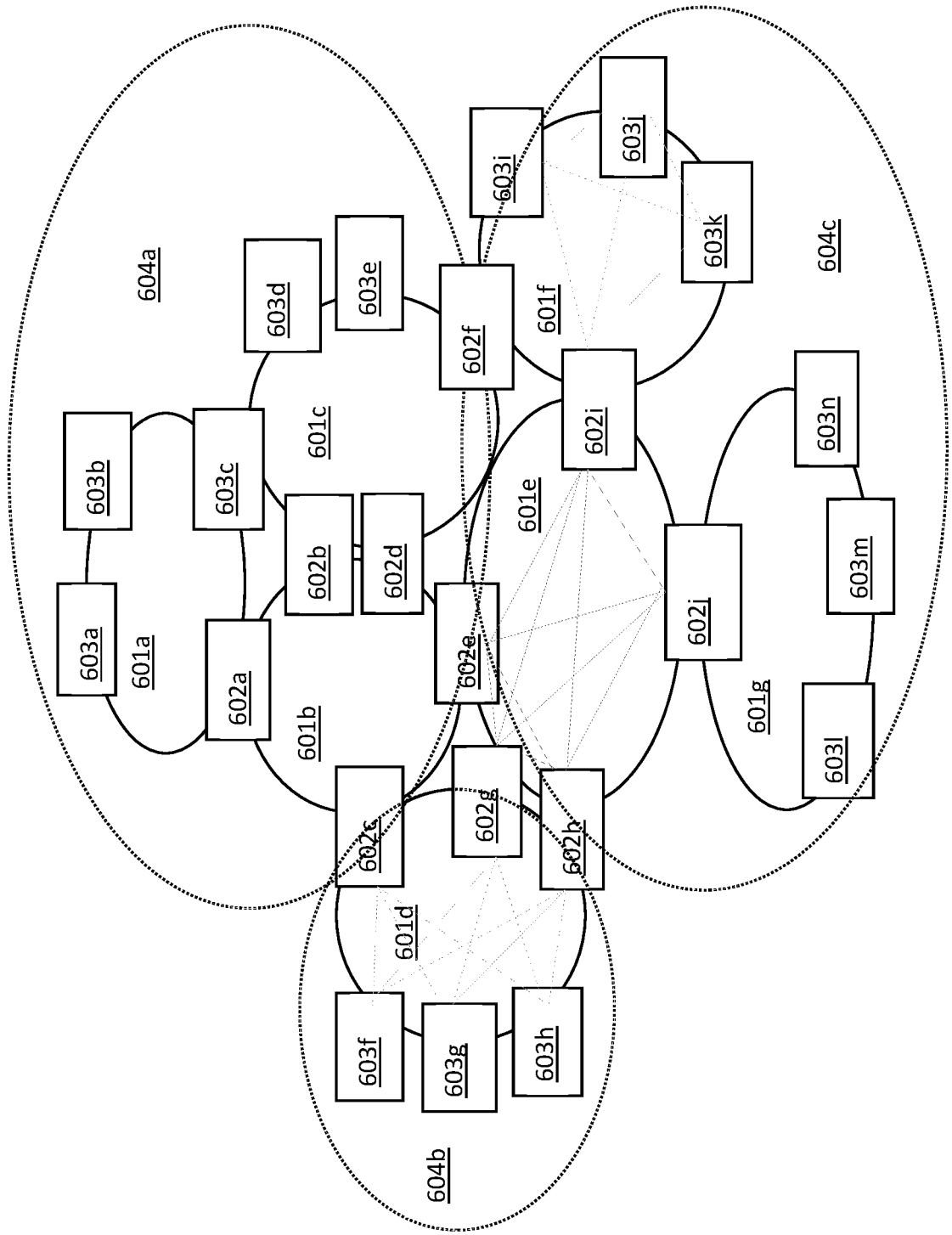
Figure 7:
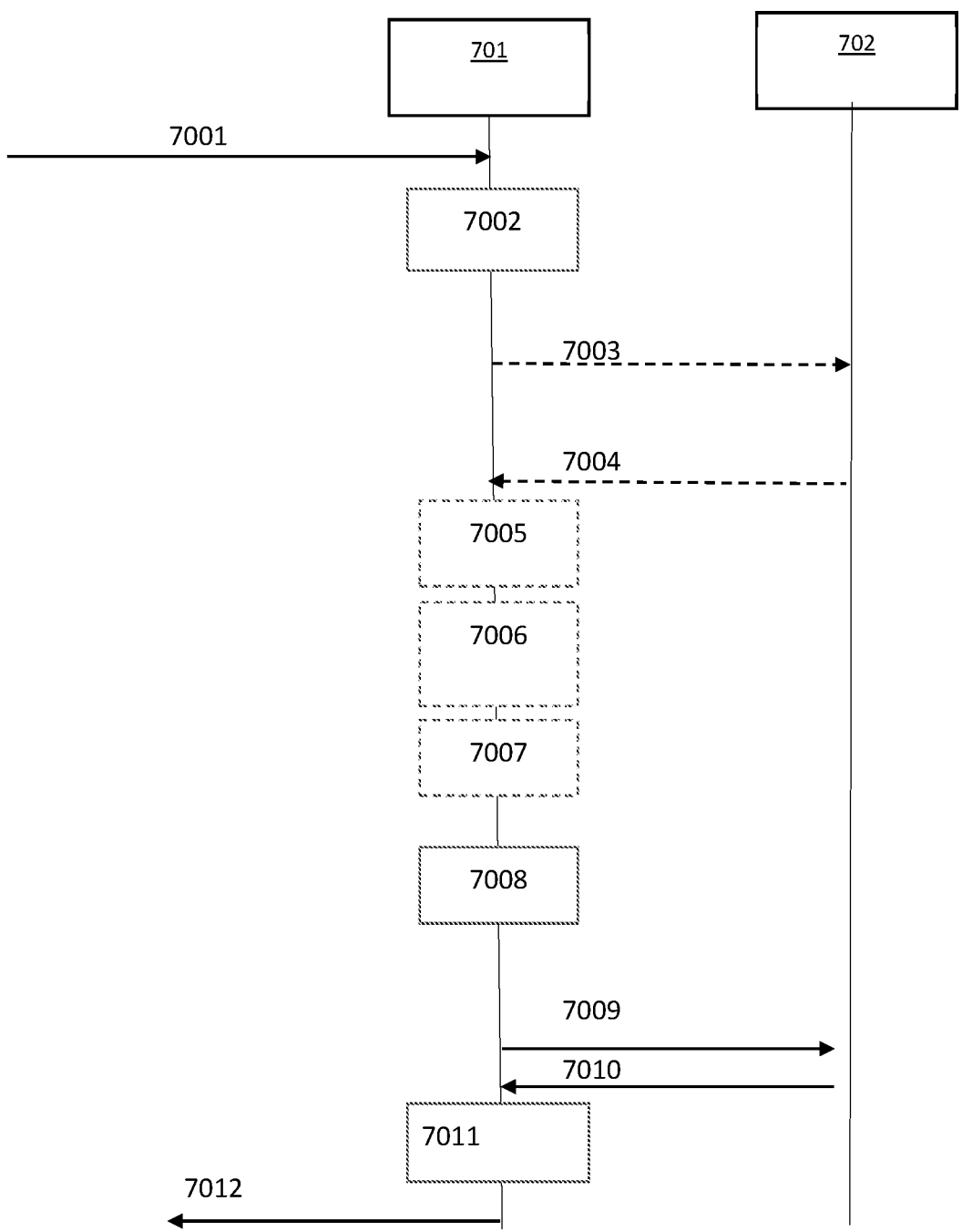
FIG. 7 shows example signaling between network elements.

Some of these concepts are illustrated as examples with respect to FIGS. 6 and 7.

FIG. 6 shows how the concept of trust domains may be applied to the SCP domain example of FIG. 5.

FIG. 6 shows a first SCP domain 601a, a second SCP domain 601b, a third SCP domain 601c, a fourth SCP domain 601d, a fifth SCP domain 601e, a sixth SCP domain 601f and a seventh SCP domain 601g.

The first SCP domain 601a comprises a first SCP 602a, which is directly connected to a first network function 603a, a second network function 602b and a third network function 602c.

The second SCP domain 601b comprises the first SCP 602a, a second SCP 602b, a third SCP 602c, a fourth SCP 602d and a fifth SCP 602e.

The third SCP domain 601c comprises the second SCP 602b, the fourth SCP 602d and a sixth SCP 602f. Together, these three SCPs are directly connected to the third NF 603c, a fourth NF 603d and a fifth NF 603e.

The fourth SCP domain 601d comprises the third SCP 602c, a seventh SCP 602g and an eighth SCP 602h. Together, these three SCPs are directly connected to a sixth NF 603f, a seventh NF 603g and an eighth NF 603h.

The fifth SCP domain 601e comprises the fifth SCP 602c, the seventh SCP 602g, the eighth SCP 602h, a ninth SCP 602i and a tenth SCP 603j.

The sixth SCP domain 601f comprises the sixth SCP 602f and the ninth SCP 602i. Together, these two SCPs are directly connected to a ninth NF 603i, a tenth NF 603j and an eleventh 603k.

The seventh SCP domain 601g comprises the tenth SCP 602j, which is directly connected to a twelfth NF 603l, a thirteenth NF 603m and to a fourteenth NF 603n.

Superposed over the top of this are three different trust domains, 604a, 604b and 60c. The first trust domain 604a comprises the first SCP domain 501a, the second SCP domain 501b and the third SCP domain 501c. The second trust domain 504b comprises the fourth SCP domain 501d. The third trust domain 504c comprises the fifth SCP domain 501e, the sixth SCP domain 501f and the seventh SCP domain SCP 501g.

SCPs that are present in multiple trust domains may be considered to be the above-mentioned bridging SCPs that police inter-trust domain communications. In relation to FIG. 6, the bridging SCPs include the third SCP 502c, the fifth SCP 502e, the sixth SCP 502f, the seventh SCP 502g and the eighth SCP 502h.

The extra policing of the communication performed by the bridging SCPs at the trust domain border may comprise at least one action of a plurality of different actions, depending on the exact implementation.

One example action may be rejecting messages or message requests based on a blacklist (i.e. not allowed list). Such a blacklist may be, for example, configured by the operator, or an SCP can dynamically create a blacklist to restrict the traffic. An SCP may dynamically create the blacklist in a number of different ways. For example, an SCP may create a blacklist based on there being heavy traffic originating from a single NF/Domain (where heavy originators would be blocked), wrongly formulating the URI, and/or using an expired authentication token. Variations of these are also discussed below.

One example action may be checking whether (or not) a target Uniform Resource Indicator (URI) is on, for example, a whitelist (i.e. allowed list) (and therefore signalling allowed to go enter the trust domain) or a blacklist (and is therefore not allowed to enter the trust domain). Another example action may be checking delegated discovery parameters such as services and locations. Delegated discovery may refer to delegating the discovery and associated selection of NF instances or NF service instances to an SCP.

Therefore, in the case of Indirect Communication with Delegated Discovery, the SCP may discover and select a suitable NF instance and NF service instance based on discovery and selection parameters provided by the requester NF and optional interaction with the NRF. Thus, an SCP may be said to be performing discovery of behalf of NFs, using discovery parameters that may be provided from the NFs. These discovery parameters may be checked by use of an appropriate whitelist or a blacklist, such as those mentioned above.

Another example action may be checking routing binding indications. A routing binding indication may be said to comprise information included in a request or notification and that can be used by the SCP for discovery of and associated selection to a target. These indications may include any of NFs, NF sets, services, and a service set. These routing binding indications may be checked by use of an appropriate whitelist or a blacklist, such as those mentioned above.

Another example action may be enforcing message or payload size limitations. For example, when a received message is above a predefined size, the bridging SCP may discard the received message. In contrast, when a received message is below a predefined size, the bridging SCP may allow the received message to enter the trust domain.

Another example action may be checking and/or modifying contents of a received message, including adding or removing some types of Hypertext Transfer Protocol (HTTP) headers.

Another example action may be mapping Service Based Interface (SBI) message priorities for messages associated with priority services. For example, the 5GS allows classification and differentiation of specific services based on subscription-related and invocation-related priority mechanisms. Therefore, messages associated with priority services may (relative to non-priority services) be more likely to be allowed to traverse different trust domains.

Another example action may be checking whether a request contains an access token. The access token may be based on at least one authentication mechanism, for example OAuth2, which is a defined authentication framework. When a bridging SCP receives signaling for an SCP within a particular trust domain without an access token, the bridging SCP may stop that signaling from being promulgated across that trust domain.

Another example action may be requesting an access token on behalf of the consumer in a particular trust domain if a request is received from a predetermined technical domain (e.g. SCP1) without an access token. When a valid access token is not received in response to this request, signaling from the predetermined technical domain to the consumer may be rejected by the bridging SCP. When a valid access token is received in response to this request, signaling from the predetermined technical domain to the consumer may be passed to the consumer by the bridging SCP.

Another example action may be checking whether a request contains a client credential assertion for identifying the requester. In such cases, requests sent to a trust/technical domain that requires producers to check the identity of consumers, i.e. whether the identity of the client credential assertion token matches the identity contained in the client credential assertion token, may be rejected if the client credential is not valid. If the client credential assertion token is valid, the signaling may be passed to the consumer.

Another example action may be policing the number of requests issued from a certain trust/technical domain. In such a case, when the number of requests reaches a predetermined number (and/or a predetermined frequency of requests) then the requests may be automatically rejected.

Another example action may be to perform protocol interworking. For example, the bridging SCP may interwork between HTTP/2 and HTTP/3.

Another example action may be applying different security mechanisms. One example security mechanism that currently exists is Transport Layer Security. However, it is understood that other security mechanisms may be applied.

Another example action may be to enforce whole path validation based on trust domain. This means that a bridging SCP may validate the whole path (from NFs to SCPs) along which signaling is made in terms of trust of domains of the different NFs and SCPs.

Another example action may be to inject an additional Token when further communication is required with other Domain SCP. This may be useful, for example, when there is more than one domain to be passed. In such a case, one domain SCP can only get an authentication token (or the like) for the next domain Therefore, if the next domain is not the ultimate target domain, this next domain would need to request another token.

The OAM may configure the relationship of trust/technical domains and SCP domains in a bridging SCP. The OAM may configure bridging SCPs with applicable policing applicable at the boundaries between trust/technical domains, including any relevant whitelists and blacklists (depending on the particular incoming and outgoing trust domain).

FIG. 7 illustrates potential signaling between a bridging SCP 701 and a network repository function 702.

At 7001, SCP 701 receives signaling from an SCP trust domain relating to a message. This signaling may comprise an access point identifier for a target Service-Based Identifier. This signaling may also comprise possible discovery parameters for discovering a next-hop location for the message. The next-hop location may be an SCP. The next-hop location may be a network function.

At 7002, SCP 701 determines a domain of the SCP that sent the signaling of 7001. This may be determined, for example, based on the IP address at which the signaling of 7001 is received.

Next, the SCP 701 aims to discover a next-hop location for the message that the received signaling of 7001 relates. In other words, the SCP 701 determines the outgoing SCP domain (i e the SCP domain to reach the next-hop SCP (if any) or otherwise the request target). This may be performed in any of a number of different ways. For example, the next-hop SCP may be determined by: analyzing the request target in the possibly received header of the signaling of 7001, and/or by selecting a request target and/or next hop SCP (if any), and/or by using the NF discovery service of the NRF to obtain SCP and/or NF profiles that can contain the SCP domain, and/or based on possibly cached profiles obtained previously via the NF discovery service, and/or based on configured information about the mapping of destination domain names (such as FQDNs) or IP addresses or address ranges to SCP domains.

At 7003, SCP 701 sends a discovery request to NRF 702. The discovery request may comprise discovery parameters that were comprised within the signaling of 7001.

At 7004, the NRF 702 may signal a discovery response to the SCF 701. The response may comprise identifiers of different network functions and a respective SCP domain in which that network function may be found. For example, the SCF 701 may receive a first NF profile for NF1 that includes an indication of a first SCP domain, and a second NF profile for NF2 that includes an indication of a second domain.

At 7005, the SCP 701 selects NF2 as a service provider and directs forwarding of incoming signaling to NF2 and the second SCP Domain 2 as an outgoing SCP domain.

At 7006, the SCP 701 receives a request comprising a header containing a URI, and selects to route the signaling towards a contained URI without other SCP and select outgoing SCP domain based on URI in that header.

At 7007, the SCP 701 selects a next-hop SCP (possibly using NF Discovery Service to query for SCPs), and determines an outgoing SCP domain as SCP domain to connect to next-hop SCP.

At 7008, the SCP determines, based on the incoming and outgoing SCP domain and configured knowledge of the relationship of trust/technical domains and SCP domains, whether the received request traverses a boundary between trust/technical domain. If so, the SCP 701 performs extra policing of the request, such as described above.

At 7009, the SCP 701 signals a request towards the outgoing SCP domain via NRF 702.

At 7010, the SCP 701 receives a response to its request from the NRF 702.

At 7011, the SCP 701 performs any extra policing required (e.g. such as when the received request is determined to traverse a boundary between trust domains.

At 7012, the SCP 701 responds to the signaling of 7001.

The presently described systems allow for several trust regions to exist within a PLMN and allows traffic to be restricted between those trust domains to provide extra security. It leverages the existing the already existing concepts of SCP domains to avoid that extra information needs to be stored in the NRF.

Figure 10:
FIGS. 8 to 10 are flow charts showing example operations that may be performed by network apparatuses.
Figure 9:
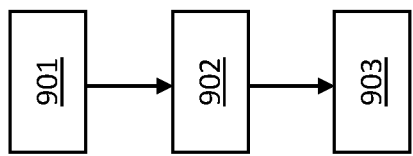
Figure 8:
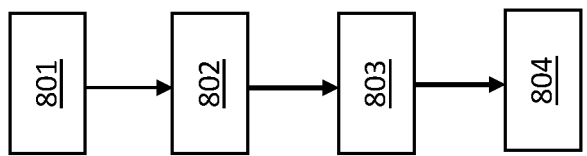

A general overview of the presently described system is presented with reference to FIGS. 8 to 10.

FIG. 8 illustrates potential actions that may be performed by a bridging SCP. Therefore, the entity performing the actions described in relation to the example of FIG. 8 may be considered to be a first service communication proxy that is trusted in both first and second domains in a communication network, the first and second domains being different to each other. The first and second domains may be SCP domains. The at least one domain with which the apparatus is trusted may be smaller than a public land mobile network in which the apparatus operates.

The at least one domain may comprise one or more service communication proxy domains.

At 801, the first service communication proxy may receive, from a first network entity associated with the first domain, a request to communicate.

At 802, the first service communication proxy may determine a second network entity to which to send the request.

At 803, the first service communication proxy may determine that the second network entity is associated with a second domain in the communication network.

The determining the second network entity, and the determining that the second network entity is associated with the second domain, may be performed by sending a discovery request to a registration entity in the communication network; receiving a response to the discovery request, the response comprising one or several candidate second network entities and for each candidate second network entity an indication of the second domain; and using the response to determine the second network entity out of the one or several candidate second network entities and that the second network entity is associated with the second domain.

The determining the second network entity, and the determining that the second network entity is associated with the second domain, may comprise: using addressing information comprised within the received request to determine the second network entity; and determining the second domain based on the addressing information. The addressing information may comprise a target uniform resource identifier comprised within a Hypertext Transfer Protocol header. As a particular example using current terminology, the HTTP header may be an Sbi-Target-apiRoot HTTP.

At 804, the first service communication proxy may enforce at least one access policy for routing the request to the network entity.

The at least one access policy may relate to at least one of: determining whether at least one parameter is on a whitelist for facilitating access to a network entity associated with the second domain in the communication network; determining whether at least one parameter is on a blacklist for facilitating access to a network entity associated with the second domain in the communication network; rejecting messages having a size greater than a threshold value; checking and/or modifying the contents of a message to be communicated to a network entity associated with the second domain in the communication network; checking the presence of access token or client credential within a message to be communicated to a network entity associated with the second domain in the communication network; requesting an access token or client credential on behalf of a network entity associated with the first domain in the communication network; rejecting a request if an access token or client credential is not comprised within a message to be communicated to a network entity associated with a second domain in the communication network, an access token or client credential is required to be included by a network entity associated with a second domain in the communication network and the apparatus cannot obtain an access token or client credential on behalf of a network entity associated with the first domain in the communication network; rejecting a request if there have been more than a predetermined number and/or predetermined frequency of requests from network entities associated with a first domain in the communication network towards network entities associated with a second domain in the communication network; and validating a path for the message to be passed from a network entity associated with the first domain in the communication network to a network entity associated with the second domain in the communication network.

The first service communication proxy may further send a registration request to a registration entity in the communication network, wherein the registration request identifies at least one domain with which the apparatus is trusted. Therefore, the request may identify multiple domains. Therefore, in the present case, the registration request may identify both the first and second domains.

The registration request may comprise at least one of: a service communication proxy identifier; a Fully Qualified Domain Name of the first service communication proxy; an Internet Protocol address of the first service communication proxy; an indication that the profile is of a service communication proxy; capacity information for the first service communication proxy; current load information for the first service communication proxy; priority information for the first service communication proxy; location information for the first service communication proxy; served location(s); Network Slice related Identifier(s); an identification of remote Public Land Mobile Networks reachable through the first service communication proxy; endpoint addresses accessible via the first service communication proxy; identifiers of service communication proxies interconnected with the first service communication proxy; identifiers of network functions interconnected with the first; network function sets of network functions served by the first service communication proxy; and service communication proxy Domains to which the first service communication proxy belongs.

The first network entity may be one of a first network function and a second service communication proxy.

The second network entity may be one of a second network function and a third service communication proxy.

FIG. 9 illustrates potential actions that may be performed by a registration entity in the communication network, such as an NRF. The presently described NRF may interact with the apparatuses described in relation to FIGS. 8 and 10

At 901, the apparatus receives, receive, from a first network entity, a registration request to register with the apparatus, the request identifying at least one domain in which the first network entity is located. Therefore, the request may identify multiple domains. The at least one domain with which the apparatus is trusted may be smaller than a public land mobile network in which the apparatus operates. The at least one domain may comprise one or more service communication proxy domains.

The registration request may comprise at least one of: a service communication proxy identifier; a Fully Qualified Domain Name of the first service communication proxy; an Internet Protocol address of the first service communication proxy; an indication that the profile is of a service communication proxy; capacity information for the first service communication proxy; current load information for the first service communication proxy; priority information for the first service communication proxy; location information for the first service communication proxy; served location(s); Network Slice related Identifier(s); an identification of remote Public Land Mobile Networks reachable through the first service communication proxy; endpoint addresses accessible via the first service communication proxy; identifiers of service communication proxies interconnected with the first service communication proxy; identifiers of network functions interconnected with the first; network function sets of network functions served by the first service communication proxy; and service communication proxy Domains to which the first service communication proxy belongs.

At 902, the apparatus determines whether the first network entity is trusted and whether the first network entity is entitled to register the identified domain.

At 903, if/when the determination is positive, the apparatus registers the first network entity for discovery.

The apparatus may be caused to: receive a request for discovering at least one service network entity; and respond to the request with information relating to the first network entity.

The first network entity may be one of a service communication proxy and a network function.

FIG. 10 illustrates potential actions that may be performed by a network entity in the communication network, such as an SCF (whether acting for itself or on behalf of an NF) or an NF. The presently described NRF may interact with the apparatuses described in relation to FIGS. 8 and 9.

At 1001, the apparatus sends, to a registration entity, a registration request to register with the apparatus, the request identifying at least one domain in which the apparatus is trusted, wherein the apparatus comprises a first service communication proxy.

The at least one domain with which the apparatus is trusted may be smaller than a public land mobile network in which the apparatus operates. The at least one domain may comprise one or more service communication proxy domains.

The registration request may comprise at least one of: a service communication proxy identifier; a Fully Qualified Domain Name of the first service communication proxy; an Internet Protocol address of the first service communication proxy; an indication that the profile is of a service communication proxy; capacity information for the first service communication proxy; current load information for the first service communication proxy; priority information for the first service communication proxy; location information for the first service communication proxy; served location(s); Network Slice related Identifier(s); an identification of remote Public Land Mobile Networks reachable through the first service communication proxy; endpoint addresses accessible via the first service communication proxy; identifiers of service communication proxies interconnected with the first service communication proxy; identifiers of network functions interconnected with the first; network function sets of network functions served by the first service communication proxy; and service communication proxy Domains to which the first service communication proxy belongs.

Figure 2:
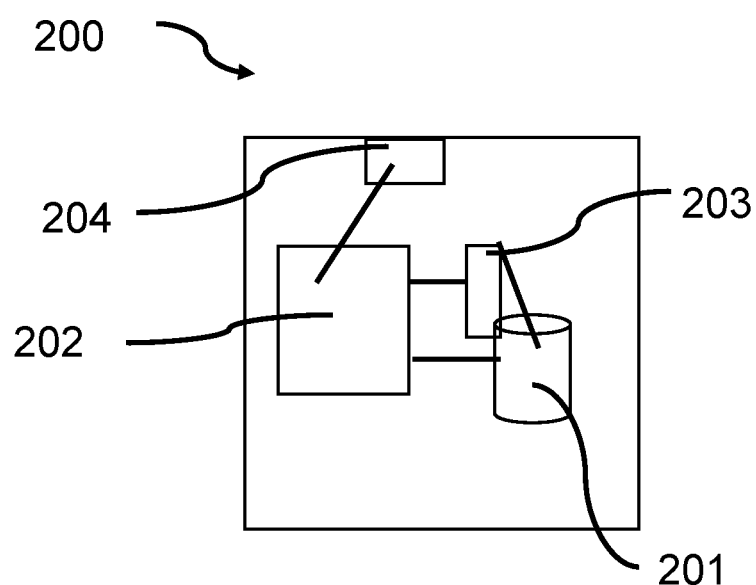
FIG. 2 shows a schematic representation of a network apparatus.

FIG. 2 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host, for example an apparatus hosting an NRF, NWDAF, AMF, SMF, UDM/UDR etc. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. The control apparatus 200 can be arranged to provide control on communications in the service area of the system. The apparatus 200 comprises at least one memory 201, at least one data processing unit 202, 203 and an input/output interface 204. Via the interface the control apparatus can be coupled to a receiver and a transmitter of the apparatus. The receiver and/or the transmitter may be implemented as a radio front end or a remote radio head. For example the control apparatus 200 or processor 201 can be configured to execute an appropriate software code to provide the control functions.

Figure 3:
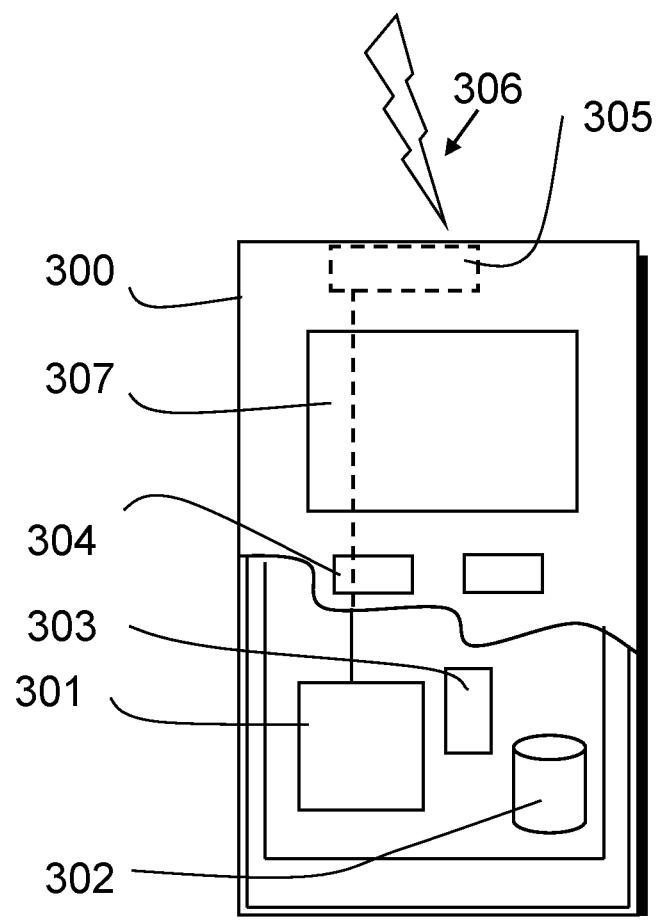
FIG. 3 shows a schematic representation of a user equipment.

A possible wireless communication device will now be described in more detail with reference to FIG. 3 showing a schematic, partially sectioned view of a communication device 300. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device.

The wireless device 300 may receive signals over an air or radio interface 306 via appropriate apparatus for receiving and may transmit signals via appropriate apparatus for transmitting radio signals. In FIG. 3 transceiver apparatus is designated schematically by block 305. The transceiver apparatus 305 may be provided for example by means of a radio part and associated antenna arrangement. The antenna arrangement may be arranged internally or externally to the wireless device.

A wireless device 300 is typically provided with at least one data processing entity 301, at least one memory 302 and other possible components 303 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 704. The user may control the operation of the wireless device by means of a suitable user interface such as key pad 304, voice commands, touch sensitive screen or pad, combinations thereof or the like. A display 307, a speaker and a microphone can be also provided. Furthermore, a wireless communication device may comprise appropriate connectors (either wired or wireless) to other devices and/or for connecting external accessories, for example hands-free equipment, thereto.

Figure 4:
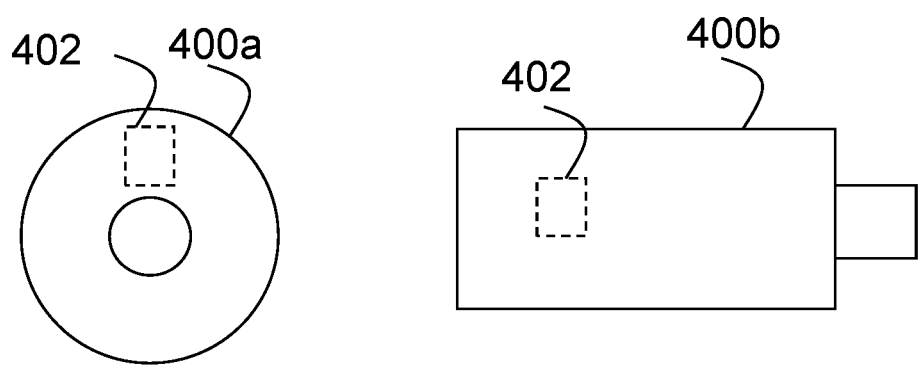
FIG. 4 shows a schematic representation of a non-volatile memory medium storing instructions which when executed by a processor allow a processor to perform one or more of the steps of the methods of some embodiments.

FIG. 4 shows a schematic representation of non-volatile memory media 400a (e.g. computer disc (CD) or digital versatile disc (DVD)) and 400b (e.g. universal serial bus (USB) memory stick) storing instructions and/or parameters 402 which when executed by a processor allow the processor to perform one or more of the steps of the methods of FIG. 10.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIG. 10, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:
(a) hardware-only circuit implementations (such as implementations in only analogue and/or digital circuitry);
(b) combinations of hardware circuits and software, such as:
  (i) a combination of analogue and/or digital hardware circuit(s) with software/firmware and
  (ii) any portions of hardware processor(s) with software (including digital signal processor(s)), software, and memory(ies) that work together to cause an apparatus, such as the communications device or base station to perform the various functions previously described; and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments. However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus comprising:
   at least one processor; and
   at least one memory including computer program code;
   the at least one memory and the computer program code being configured to, with the at least one processor, cause the apparatus at least to perform:

receive, from a first network entity associated with a first domain in a communication network, a request to communicate;
determine a second network entity to which to send the request;
determine that the second network entity is associated with a second domain in the communication network; and
enforce at least one access policy for routing the request to the second network entity;
wherein the apparatus is a first service communication proxy trusted in both the first and second domains; and
wherein the determination of the second network entity, and the determination that the second network entity is associated with the second domain, comprise causing the apparatus to perform:
send a discovery request to a registration entity in the communication network;
receive a response to the discovery request, the response comprising one or several candidate second network entities and for each candidate second network entity an indication of the second domain; and
use the response to determine the second network entity out of the one or several candidate second network entities and that the second network entity is associated with the second domain.

\* \* \* \* \*